Oct. 8, 1929.                   M. W. HARD                    1,730,610
                              AUTOMOBILE RACK
                           Filed June 15, 1926            3 Sheets-Sheet 1
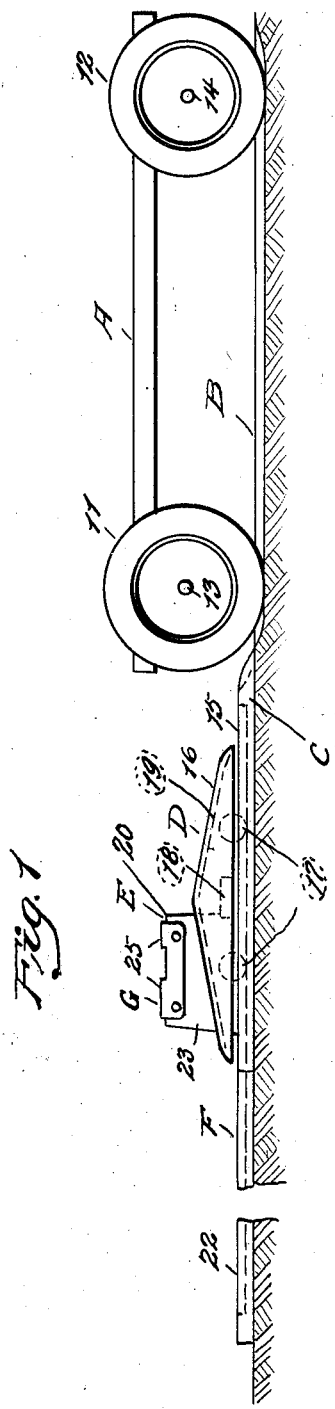
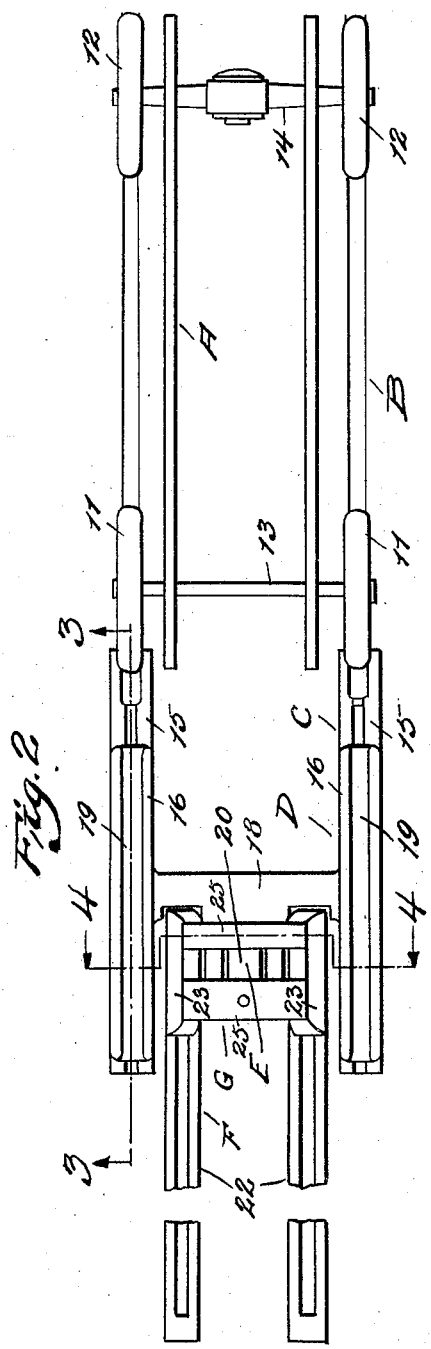
INVENTOR
MERRILL W. HARD,
By R. S. Berry,
           ATTORNEY.

Oct. 8, 1929.  M. W. HARD  1,730,610
AUTOMOBILE RACK
Filed June 15, 1926　　3 Sheets-Sheet 2
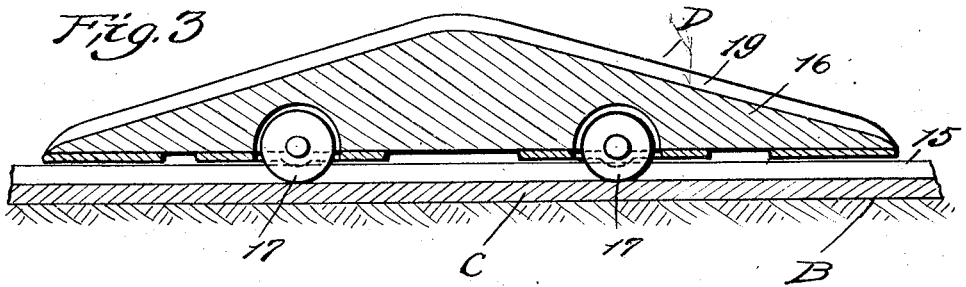
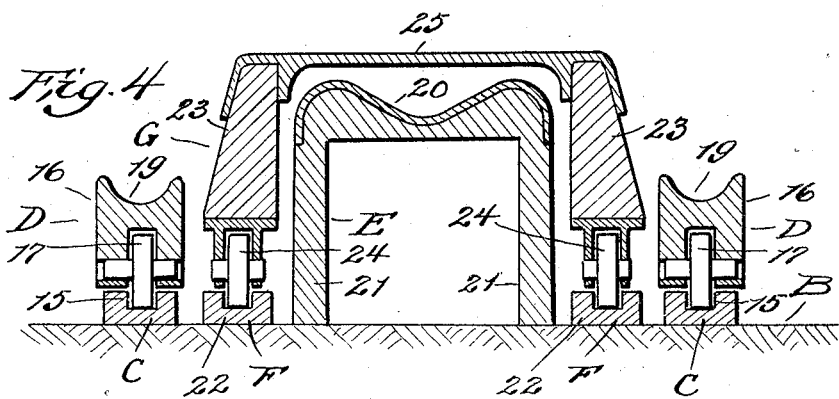
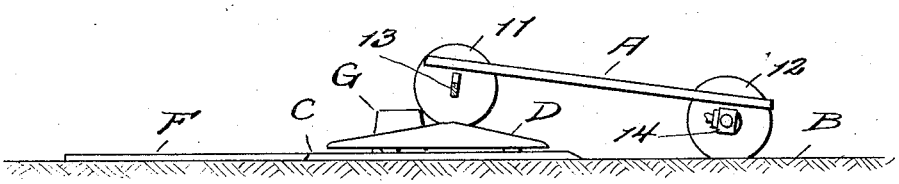
INVENTOR
MERRILL W. HARD,
By R. S. Berry,
ATTORNEY.

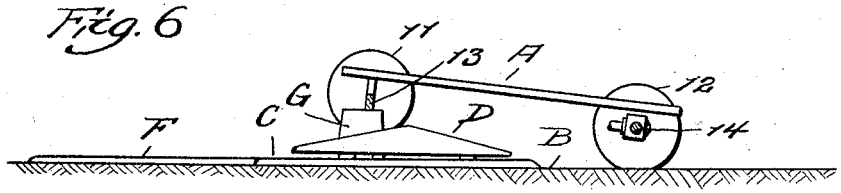
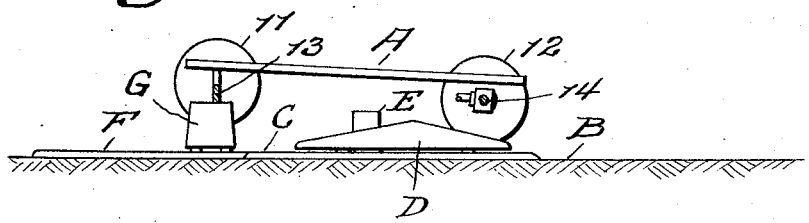
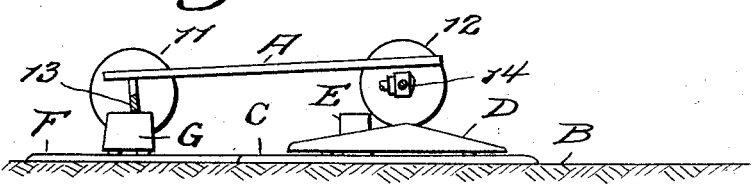
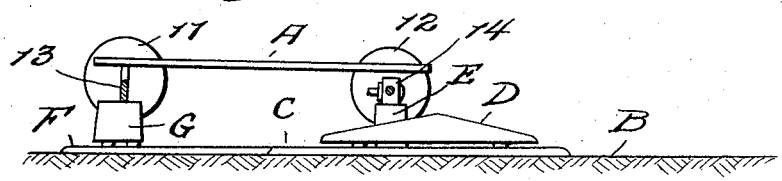
INVENTOR
MERRILL W. HARD,
By R. S. Berry
ATTORNEY.

Patented Oct. 8, 1929

1,730,610

UNITED STATES PATENT OFFICE

MERRILL W. HARD, OF GLENDALE, CALIFORNIA, ASSIGNOR, BY MESNE ASSIGNMENTS, OF ONE-FOURTH TO O. B. ENGLISCH, OF CHICAGO, ILLINOIS, AND ONE-FOURTH TO LEBAN E. RICHEY, OF LOS ANGELES, CALIFORNIA

AUTOMOBILE RACK

Application filed June 15, 1926. Serial No. 116,159.

This invention relates to improvements in automobile racks and more particularly to an elevated support having an inclined approach upon which an automobile may be rolled and held in elevated position for access to its underneath parts.

In this art there are three distinct types of apparatus:—

First: The common and well known fixed elevated wheel supports with fixed inclined approaches upon which automobiles are rolled and held supported upon their wheels;

Second: Apparatuses involving jacks for lifting and holding automobiles elevated and with their wheels freed; and Third: Apparatuses involving revolving elements in which the automobiles are secured and bodily tilted.

In the first named class the automobile is supported upon its wheels, hence the wheels are not free for operations thereon.

In the second named class the elevation of the automobile as by the jacks, is a step distinct from the setting of the automobile and its construction, installation and operation are expensive.

In the third named class, the setting is again distinct from the tilting and is expensive from both structural and operating standpoints.

Among the objects of my invention is to construct an automobile rack in which the setting of the automobile, as by a simple rolling upon the rack automatically elevates the automobile and holds it in elevated position with its supporting wheels freed for operations thereon.

My improvements consist in the novel construction, arrangement and combination of parts as hereinafter fully, clearly and concisely described, definitely pointed out in my claims and illustrated by the accompanying drawings (3 sheets) in which:—

Fig. 1 shows in side elevation a rack constructed in accordance with my invention;

Fig. 2 is a plan view of the rack;

Fig. 3 is a longitudinal sectional elevation of the movable ramp as taken on the line 3—3 of Fig. 2.

Fig. 4 is a transverse sectional elevation, as taken on the line 4—4 of Fig. 2, showing the relation between the movable ramp, and the fixed and movable supports for the axles of the automobile after elevation by the ramp;

Fig. 5 is a diagrammatical elevation showing an automobile as rolled upon the ramp to a position with its forward wheels at the apices of the ramp and its front axle brought to a plane above the axle supports;

Fig. 6 is a view similar to Fig. 5 showing the automobile wheels as advanced beyond the apices of the ramp and the front axle as brought to and rested upon the axle supports;

Fig. 7 is a diagrammatical elevation showing the front axle and wheels as carried forward in elevated position and the rear wheels as rolling upwardly over the ramp;

Fig. 8 shows the rear wheels as having reached the apices of the ramps; the rear axle as brought to a plane above the fixed support and the front axle as advanced from its position shown in Fig. 7;

Fig. 9 shows the rear wheels as moved beyond the apices of the ramps, still in engagement with the ramp and the rear axle as rested upon the fixed support; and Fig. 10 is a fragmental diagrammatical elevation, showing the rear axle as rested on the fixed support and the ramp moved rearwardly to free the wheels.

Referring more specifically to the drawings, A designates a vehicle comprising wheels 11 and 12 and framing, or running gear, elements such as the axles 13 and 14, the showing in the drawings, being representations of an ordinary automobile.

For fixed location, as upon the floor B, of a garage, I provide a trackway C comprising, by preference, relatively spaced grooved rails 15—15.

Mounted for travel longitudinally of the trackway C is an elevator D, comprising a pair of substantially triangular-shaped ramps 16—16, each having wheels 17—17 for travel upon the trackway C (the grooved rails 15) and which are relatively connected, as by a cross-piece 18, for parallel movements and whose upper faces are provided with grooves 19, sectionally shaped to substantially conform with the peripheries of the wheels 11 and 12 of the vehicle and whose gauge is that of the wheels of the vehicle.

Disposed intermediate of and within the lengths of the rails 15 of the trackway C is a fixed axle support or a block E, whose upper, functionate surface 20 occupies a plane higher than the plane of the apices of the ramps 16 of the elevator D and is resident, with relation to the lengths of the ramps, forwardly of the apices thereof, and by preference, its body or standard 21 is arranged to coact with the cross-piece 18, connecting the ramps, to definitely determine the limit of travel of the ramps relative to the functioning surface 20 of the block.

A second trackway F, comprising spaced rails 22 is located between and aligned with the rails 15 of the trackway C and its length comprehends at the forward ends of the rails 22, the block E, which block is located between the rails 22.

A movable axle support or dolly G, comprising standards 23, having supporting wheels 24 for travel on the rails 22 of the trackway C, and relatively spaced bridging pieces 25, is arranged for movements over the trackway and to straddle or ride over the fixed axle support or block E.

Assuming the vehicle A to be operated upon, the elevators D, the fixed block E and movable block G to be related as shown in Fig. 1, that is with the movable block G brought to a position overriding the fixed block E, the elevators D, with their apices located, immediately in advance of the blocks E and G, and held against forward movement as by the cross-piece 18 and block E, as recited, the vehicle A is first advanced over the elevator to cause the axle 13 thereof to be brought to a plane above the blocks E and G (as shown in Fig. 5), as by being rolled upon its wheels 11 and 12 to a position bringing its wheels 11 to the apices of the ramps of the elevator.

A continued advancement of the vehicle as by rolling its wheels 11 beyond or over the apices of the ramps will bring the axle 13 to a position resting on the standards 23 of the movable block, (as shown in Fig. 6) between the bridging pieces 25, which latter serve to advance the movable block with the continued advancement of the vehicle.

In Fig. 7 I show the block G as advanced beyond the block E and the rear wheels 12 as riding up the elevator D.

In Fig. 8 the rear wheels 12 are brought to the apices of the elevator to elevate the rear axle 14 above the plane of the fixed block E, in the same manner as was the front axle (13) as shown in Fig. 5.

In Fig. 9 the rear wheels 12 are shown as having been rolled over or beyond the apices of the elevator and the rear axle rested upon the fixed block E and the movable block G carried to its limit of movement by the forward axle 13.

In Fig. 10 the elevator D is shown as having been moved rearwardly, from its position as defined by the cross-piece 18 and block E, whereby the rear wheels 12 are freed for operations thereon.

It will be obvious that the vehicle may be brought to and held in a position with its wheels all freed by a simple rolling upon its supporting wheels.

And it will be further obvious that the freeing of the axles and the lowering of the supporting wheels to the ground surface is brought about in the same manner as the elevating of the vehicle by the simple reversal of the direction of travel of the vehicle.

I claim:—

1. An apparatus of the class described comprising a pair of ramps, a trackway for the ramps, a fixed block in the path of travel of the ramps, means for limiting the travel of the ramps relatively to the fixed block, a movable block arranged to override the fixed block, and a trackway for said movable block.

2. An automobile rack comprising a pair of ramps, an immovable support for the rear axle of an automobile, and a movable support for the front axle of the automobile consisting of a bridged structure dimensioned to ride over, or straddle, the immovable support.

3. An automobile rack comprising a pair of ramps, an immovable support for the rear axle of an automobile, an element carried by the ramps for engagement with the immovable support for limiting the forward movement of the ramps, a movable support for the front axle of the automobile consisting of a pair of wheeled standards and a bridging element connecting the standards and dimensioned whereby it may be brought to a position with its bridging element above said immovable support.

4. An automobile rack comprising a base, ramps for raising and allowing to descend the front and rear wheels of an automobile, a support movable relatively to the base for catching the front of the automobile as it descends and transporting it forwardly, and a second support disconnected from the front support and stationary relatively to the base to catch the rear of the automobile as it descends from said ramp.

5. An automobile rack comprising a base, ramps for raising and allowing to descend the front and rear wheels of an automobile, a support movable relatively to the base for catching the front of the automobile as it descends and transporting it forwardly, and a second support stationary relatively to the base to catch the rear of the automobile as it descends from the ramp, the tops of the supports extending a substantial distance lengthwise of said base to accommodate automobiles of substantially different heights.

6. An automobile rack comprising a base, a forwardly movable support for the front of the automobile and a second support with its top lower than the top of the first mentioned support and its top portion stationary relative to the base for supporting the rear of the automobile, and means for changing the relative elevations between the automobile and the supports to first raise the front of the automobile on the movable support and by a continuous forward motion of the automobile, finally raise the rear of the automobile on the stationary support.

7. An automobile rack comprising a base, a forwardly movable support for the front of the automobile and a second support stationary relative to the base for supporting the rear of the automobile, and means for changing the relative elevations between the automobile and supports to rest the automobile on the supports, the tops of both said supports extending a substantial distance in planes extending lengthwise of the automobile and the supports normally overlapping in transversely extending planes.

8. An automobile rack comprising a base, ramps for raising and lowering to position the front and rear wheels of an automobile, a support movable relatively to the base for catching the front axle of the automobile as it descends and transporting it forwardly, and a second support stationary relatively to the base to catch the rear axle of the automobile as it descends from said ramps, one of said supports being normally enclosed by the other support until separated by the automobile, and said ramps being movable relative to the base.

In testimony whereof, I have affixed my signature.

MERRILL W. HARD.